United States Patent [19]
McLemore

[11] Patent Number: 4,780,028
[45] Date of Patent: Oct. 25, 1988

[54] SOLIDS FEEDER

[75] Inventor: Jerry R. McLemore, Bartlesville, Okla.

[73] Assignee: Phillips Petroleum Company, Bartlesville, Okla.

[21] Appl. No.: 509,539

[22] Filed: Jun. 30, 1983

[51] Int. Cl.$^4$ .............................................. B65G 53/46
[52] U.S. Cl. ........................................ 406/68; 406/63
[58] Field of Search ..................... 406/50, 74, 63–68

[56] References Cited

U.S. PATENT DOCUMENTS

| | | | |
|---|---|---|---|
| 2,244,050 | 6/1941 | Cassiere | 406/68 |
| 2,694,496 | 11/1954 | Atkinson | 406/65 |
| 2,757,049 | 7/1956 | Temple | 406/64 |
| 3,909,068 | 9/1975 | Coucher | 406/63 |

FOREIGN PATENT DOCUMENTS 252179  2/1970  U.S.S.R. .
317590  1/1972  U.S.S.R. .

Primary Examiner—Joseph F. Peters, Jr.
Assistant Examiner—Paul E. Salmon
Attorney, Agent, or Firm—Williams, Phillips & Umphlett

[57] ABSTRACT

A feeder is disclosed for introducing slug of a particulate material into a gas stream. The feeder is characterized by a valve member positioned in a housing and movable from a first position to a second position and from a second position to a third position. A first passage through the valve member connects to an inlet port of the housing when the valve member is in first position. The first passage connects the second inlet port to the outlet port when the valve member is in the second position. A second passage through the valve member which is isolated from the first inlet port throughout operation connects the second inlet port to the outlet port when the valve member is in third position. In a preferred embodiment, the rotor of a rotary feeder is provided with alternating bores and channels parallel to the longitudinal axis of the rotor circumferentially spaced apart inwardly from the surface of the rotor.

6 Claims, 2 Drawing Sheets

SOLIDS FEEDER

BACKGROUND OF THE INVENTION

In one aspect the invention relates to a valve member. In another aspect, the invention relates to a solids feeder. In yet another aspect, the invention relates to a process for introducing a particulate material into a tubular member.

The feeding of frangible solids, such as lignite, coal, catalyst, additives and the like into a pneumatic line against a pressure gradient is difficult to accomplish with economy. To maintain the particulate material in motion through the transport line between dumpings of the feeder, the gas flushing the feeder pockets or cavities must be at a high velocity. This generally means that the gas will also be at a high pressure so that the gas will undergo a high pressure drop through the transport line. As the feeder cavity is left pressurized after the particles are ejected its depressurization upon its return to the solids inlet to receive another supply of particulate represents a net energy loss and also causes difficulty in reloading the cavity because the pressurized gas impedes the flow of particulate into the cavity. Feeder operation with a relatively low pressure fluid would mitigate these problems.

A further advantage of using relatively low pressure conveying gas would be reduction of the tendency of the gas to disperse the particulate material as a dilute phase in the transport line upon flushing the cavity. The material could be slugged through the line in dense phase utilizing a relatively low volume of relatively low pressure conveying gas.

OBJECTS OF THE INVENTION

It is an object of this invention to provide a valve for a particle feeder which allows the particulate material to be transported at low pressure and with low volume of conveying gas in dense phase with the good accuracy of a pocket feeder.

It is a further object of this invention to provide a feeder for particulate material which slugs the particulate material into a conveying gas stream.

It is another object of this invention to provide a method for introducing a particulate material into a tubular member which allows the utilization of a low volume of a relatively low pressure conveying gas to transport the material.

SUMMARY OF THE INVENTION

In one aspect, the invention comprises a valve member having a first end and a second end and a longitudinal axis extending between the first end and the second end and an exterior surface which is generally rotationally symmetric about the longitudinal axis. The exterior surface has at least one channel recessed in it extending along the exterior surface from the first end to the second end of the valve member. At least one borehole is circumferentially apart from the at least one channel and radially spaced apart from the longitudinal axis of the valve member. The borehole connects the first end of the valve member with the second end.

In another aspect of the present invention, a feeder comprises a housing having a first inlet port, a second inlet port, and an outlet port. A valve member is positioned in the housing and seals the first inlet port from the second inlet port. The valve member is movable from a first position to a second position and from a second position to a third position. The third position can be the same as or different from the first position. The valve member has a first passage therethrough which is connected to the first inlet port of the housing when the valve member is in the first position and is connected to the second inlet port and also the outlet port when the valve member is in the second position. The valve member further has a second passage therethrough which is isolated from the first inlet port and connects the second inlet port to the outlet port when the valve member is in the third position.

In another aspect of the present invention, there is provided a process for introducing a particulate material into a tubular member. The process comprises positioning a pocket of particulate material between a source of pressurized gas and the tubular member and blowing the particulate material into the tubular member with the pressurized gas. A passage is then positioned between the source of pressurized gas and the tubular member and pressurized gas is blown through the passage and into the tubular member and the steps are repeated as desired so that particulate material is transported as slugs through the tubular member.

DETAILED DESCRIPTION OF THE INVENTION

Figure 1:
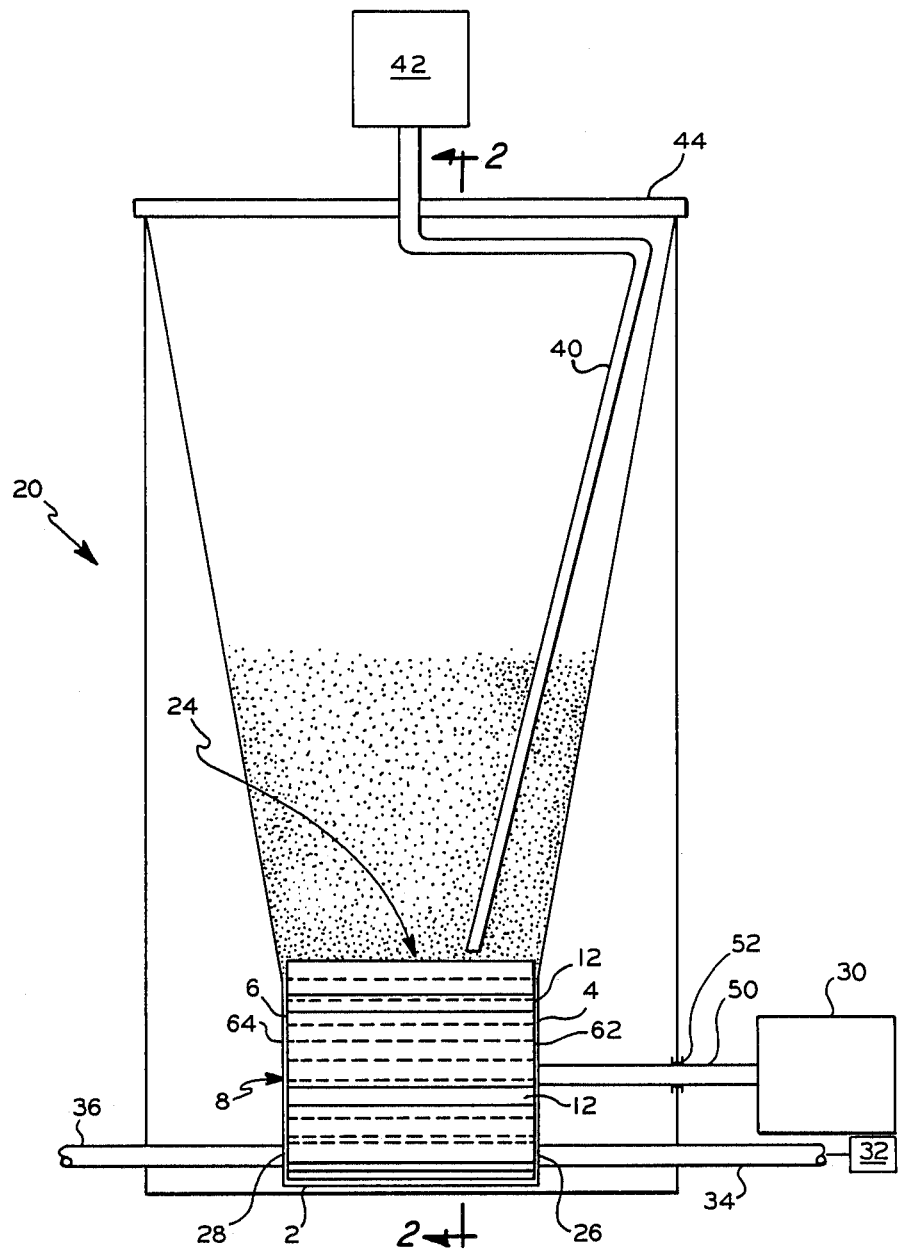
FIG. 1 schematically illustrates certain features of one embodiment of the present invention.
Figure 2:
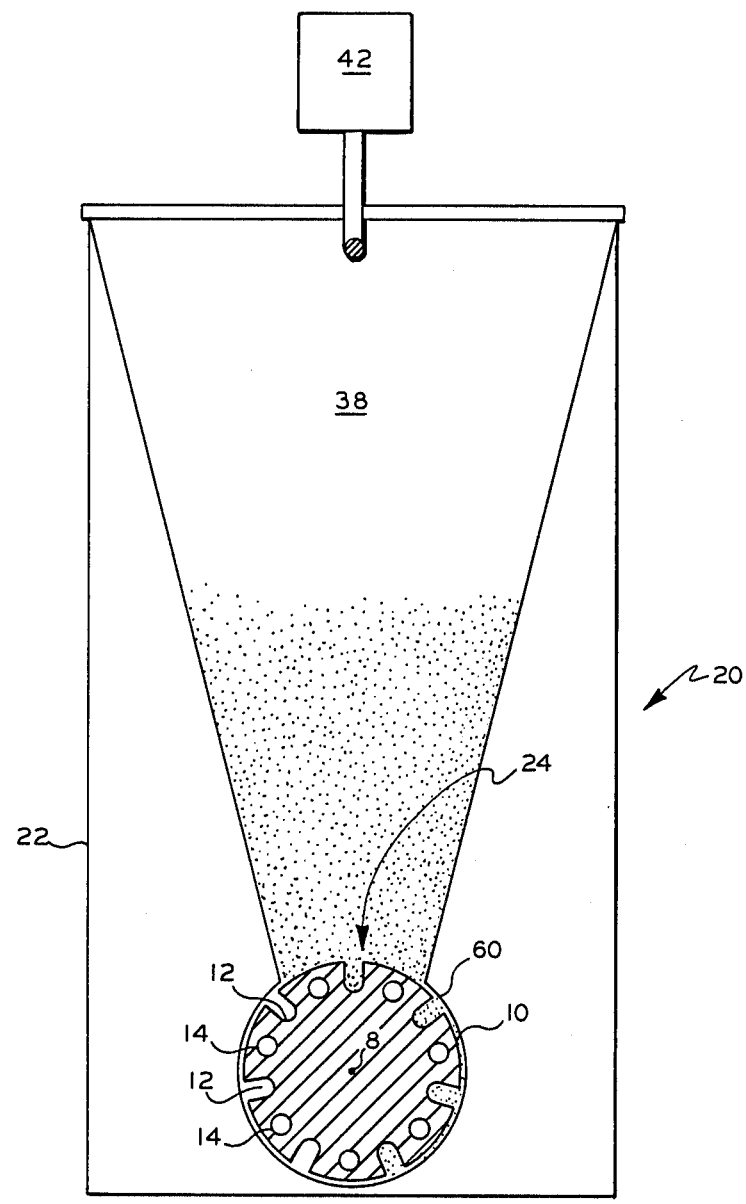
FIG. 2 is a side view of the apparatus as shown in FIG. 1 when viewed along line 2—2.

In one aspect, the invention relates to a valve member 2 having a first end 62 and a second end 6 and a longitudinal axis 8 extending between the first end 62 and the second end 6. The valve member 2 has an exterior surface 10 which is generally rotationally symmetric about the longitudinal axis 8 of the valve member 2. The exterior surface 10 of the valve member 2 has at least one channel or trough 12 recessed therein and extending along the exterior surface 10 from the first end 62 to the second end 6. The valve member 2 further defines at least one borehole 14 which is circumferentially spaced apart from the at least one channel 12 and radially spaced apart from the longitudinal axis 8 of the valve member 2. The at least one borehole 14 connects the first end 62 with the second end 6 of the valve member 2.

In a preferred embodiment, the valve member 2 has a generally cylindrical shape defined by the exterior surface 10 except for the channels 12. The channels 12 and boreholes 14 are about equidistantly circumferentially spaced apart from each other in an alternating sequence of boreholes and channels. Preferably, the boreholes 14 and channels 12 are about equally spaced apart from the longitudinal axis 8 of the valve member 2.

Generally the valve member 2 will comprise at least one borehole 14 and at least one channel 12. Usually the valve member 2 will define from about 2 to about 20 channels 12 and from about 2 to about 20 boreholes 14. Preferably the valve member 2 will define from about 2 to about 12 channels 12 and about 2 to about 12 boreholes 14. Generally, each borehole 14 will have a generally cylindrical shape and define a diameter in the range from about 0.05 to about 0.2 times the diameter of the generally cylindrical valve member 2. Each borehole 14 will usually be spaced apart from the exterior surface 10 of the valve member 2 at a distance centered from about 0.6 to about 2 borehole diameters from the exterior surface 10 of the valve member 2. The channels 12 preferably have a width about the same as that of the boreholes 14 for ease of fabrication, since they can be formed by opening a borehole 14 to the generally cylindrical exterior surface 10 with a suitable cutter to form it into a channel or trough. The channels 12 thus usually have a width about the same as the diameter of a borehole 14 and a depth in the range generally of from about 0.6 to 2 times the diameter of a borehole 14.

The valve member 2 can be formed from any suitable material. The material should be able to withstand abrasion from the particles being metered. Polymeric materials, such as Teflon, which is polytetrafloroethylene, can be suitable. Metals, such as steel or stainless steel, can also be used with good results and may be necessary where the valve member 2 spans across a high pressure drop.

In one aspect of the present invention, an apparatus illustrated generally by the reference numeral 20 comprises a housing 22 having a first inlet port 24, a second inlet port 26 and an outlet port 28. A valve member 2 is positioned in the housing 22 sealing the first inlet port 24 from the second inlet port 26. The valve member is movable from a first position to a second position and from the second position to a third position which is the same as or different from the first position. Preferably, the valve member 2 is rotatable about its longitudinal axis between the positions. To expeditiously accomplish rotation of the valve member 2 in this embodiment, a means 30 is axially connected to the valve member 2 for rotating it. The means 30 will generally be operable to rotate the valve member 2 at a speed in the range of from about 1 to about 1000 revolutions per minute, generally between about 10 and 100 revolutions per minute. The valve member has a first passage therethrough such as a channel 12 which is connected to the first inlet port 24 of the housing 22 when the valve member is in the first position and is connected to the second inlet port 26 and the outlet port 28 when the valve member 2 is in the second position. The valve member is further provided with a second passage such as a borehole 14 therethrough which is isolated from the first inlet port 24 and connects the second inlet port 26 to the outlet port 28 when the valve member 2 is in the third position. Preferably, the second inlet port 26 and the outlet port 28 are in axial alignment with each other. In this arrangement, a source of pressurized fluid 32 can be connected to the inlet port 26 by a suitable tubular member 34 to sweep particulate material carried by the channel 12 from the valve member 2, through the outlet port 28, and into a pneumatic conveyor 36 which is connected to a reactor or some other desired processing step. A source of particulate material 38 is connected to the first inlet port 24. In one embodiment, the source 38 comprises a feed bin which contains the particulate material in gravity feeding relationship with the inlet port 24. A stirrer 40 which is powered by a motor means 42 revolves around the feed bin 38 to prevent rat-holing of the particulate material in the bin 38. In one embodiment, the bin 38 is provided with a cover 44 sealing the bin 38 from its environment and allowing for pressurizing of the bin 38. With the bin pressurized, the need for seals between the valve member 2 and the housing 22 is nearly obviated. The linkage 50 between the drive means 30 and the valve member 2 should still preferably be provided with a seal 52 where it passes through the housing. The method for attaching the cover 44 to the bin 38 should be selected to withstand the pressure in the bin 38.

The housing 22 preferably contains a chamber defined by a generally cylindrical sidewall 60 which rather closely receives the valve member 2. Where the bin 38 is pressurized to about the same pressure as the source of pressurized gas 32, clearances between the valve member 2 and the housing 22 can range up to several thousandths of an inch without severely adversely affecting performance. The sidewall 60 is connected to a first end wall 4 which is in juxtaposition closely adjacent to the first end 62 of the valve member 2. The sidewall 60 is also connected to a second end wall 64 which is in close juxtaposition to the second end 6 of the valve member 62. The inlet 24 opens to the chamber defined by sidewall 60 through the generally cylindrical sidewall 60. The second inlet port 26 opens into the chamber defined by sidewall 60 through the first end wall 4 at a position which is circumferentially spaced apart from the first inlet port 24. The outlet port 28 opens into the chamber defined by the sidewall 60 through the second end wall 64 which is circumferentially spaced apart from the inlet port 24 and preferably in axial alignment with the second inlet port 26.

In yet another aspect of the present invention, there is provided a process for introducing a particulate material such as pulverized coal, lignite, powdered catalyst or the like into a tubular member which can be a pneumatic conveyor 36. The process proceeds by positioning a pocket of particulate material which can be carried by channel 12, for example, between a source of pressurized gas such as the source 32 and a tubular member such as the pneumatic conveyor 36 and blowing the particulate material into the tubular member with the pressurized gas. The next required step in the process is positioning of an empty passage such as a borehole 14 between the source of pressurized gas and the tubular member and blowing pressurized gas from the source 32 into the tubular member. The steps are alternately repeated so that the tubular member carries the particulate material as slugs (dense phase) more or less separated by pockets of pressurized gas (dilute phase) through the tubular member. In a preferred embodiment of the invention, the pockets are of particulate material and the passages are alternately positioned between the source of pressurized gas and the tubular member by rotation of the rotor of a rotary feeder with the rotor defining circumferentially alternating pockets and passages along its length.

The particulate material which can be conveyed according to the invention can generally be characterized by particle size in the range of from about 200 mesh or smaller up to a quarter inch. It is expected that the invention will have special applicability for conveying particulate materials which can be selected from a group consisting of lignite, coal, catalyst, polymer and additives to various processes. Pressurized gas will generally be selected from the group consisting of air, oxygen, nitrogen, steam, hydrogen, carbon dioxide, sulfur dioxide, ammonia and various mixtures of the above depending upon compatibility with process requirements downstream of the pneumatic transfer line 36.

While there have been illustrated and described certain preferred features of the present invention, it is not to be construed as so limited except to the extent that such limitations are found in the claims.

What is claimed is:

1. A process for introducing a particulate material into a tubular member comprising
   (a) positioning an empty pocket at a source of particulate material;
   (b) positioning a pocket of particulate material between a source of pressurized gas and said tubular member, and in axial alignment with said source of pressurized gas and said tubular member, and blowing the particulate material into the tubular member with the pressurized gas;
   (c) positioning a passage between the source of pressurized gas and the tubular member, and in axial alignment with said source of pressurized gas and said tubular member, and blowing pressurized gas though said passage into the tubular member; and
   (d) repeating steps (a), (b) and (c).

2. A process as in claim 1 further comprising conveying the particulate material through the tubular member as slugs separated by pockets of pressurized gas.

3. A process as in claim 2 further comprising positioning the empty pocket, the pocket of particulate material and the passage by rotation of a rotor in a rotary feeder, said rotor defining circumferentially alternating pockets and passages.

4. A process as in claim 3 wherein the particulate material is characterized by a particle size in the range of from about 200 mesh up to about ¼ inch and is selected from the group consisting of lignite, coal, catalyst, and polymer, and the pressurized gas is selected from the group consisting of air, oxygen, nitrogen, steam, hydrogen, carbon dioxide, sulfur dioxide, ammonia, and mixtures thereof.

5. A generally cylindrical valve member having a first end and a second end, a longitudinal axis extending between the first end and the second end, and an exterior surface which is generally rotationally symmetric about the longitudinal axis, said exterior surface having a plurality of channels recessed therein and extending along said exterior surface from the first end to the second end thereof, said valve member additionally having a plurality of boreholes extending from the first end to the second end thereof, said boreholes being circumferentially spaced apart from and alternatively positioned between said channels, said boreholes and channels being about equally radially spaced apart from the longitudinal axis of the valve member and about equally circumferentially spaced apart from each other.

6. Apparatus comprising
   (a) a housing having a first inlet port, a second inlet port, and an outlet port; wherein the housing defines a generally cylindrical chamber defined by a sidewall, a first end wall and a second end wall, the first inlet port opening into the chamber through the sidewall, the second inlet port opening into the chamber through the first end wall at a position circumferentially spaced apart from the first inlet port and the outlet port opening into the chamber through the second end wall in axial alignment with the second inlet port; and
   (b) a valve member positioned within the housing sealing the first inlet port from the second inlet port and from the outlet port, said valve member being generally cylindrical in shape and having a first end and a second end, a longitudinal axis extending between the first end and the second end, and an exterior surface which is generally rotationally symmetric about the longitudinal axis, said exterior surface having a plurality of channels recessed therein and extending along said exterior surface from the first end to the second end thereof, said valve member additionally having a plurality of boreholes extending from the first end to the second end thereof, said boreholes being circumferentially spaced apart from and alternatively positioned between said channels, said boreholes and channels being about equally radially spaced apart from the longitudinal axis of the valve member and about equally circumferentially spaced apart from each other;

said valve member being rotatable within the generally cylindrical chamber from a first position to a second position and from the second position to a third position which is the same as or different from the first position, one of said channels being connected to the first inlet port of the housing when the valve member is in the first position, said one of said channels being connected to the second inlet port and to the outlet port when the valve member is in the second position, each of said boreholes being maintained in isolation from the first inlet port, and a selected one of said boreholes being connected to the second inlet port and the outlet port when the valve member is in the third position.

* * * * *